(12) United States Patent
Yancey

(10) Patent No.: US 7,392,032 B2
(45) Date of Patent: Jun. 24, 2008

(54) MODULAR ASIC WITH CROSSPOINT SWITCH

(75) Inventor: Jerry W. Yancey, Rockwall, TX (US)

(73) Assignee: L3 Communications Corporation, New York, NY (US)

( * ) Notice: Subject to any disclaimer, the term of this patent is extended or adjusted under 35 U.S.C. 154(b) by 75 days.

(21) Appl. No.: 11/323,696

(22) Filed: Dec. 30, 2005

(65) Prior Publication Data

US 2007/0152862 A1 Jul. 5, 2007

(51) Int. Cl.
*H04B 15/00* (2006.01)
(52) U.S. Cl. .......................................... 455/313; 326/38
(58) Field of Classification Search ............. 326/37–41; 375/316, 343; 455/110, 114, 313, 324
See application file for complete search history.

(56) References Cited

U.S. PATENT DOCUMENTS

| | | | | |
|---|---|---|---|---|
| 5,559,450 A | * | 9/1996 | Ngai et al. ..................... 326/40 |
| 5,661,662 A | * | 8/1997 | Butts et al. ..................... 716/16 |
| 7,076,595 B1 | * | 7/2006 | Dao et al. ..................... 710/317 |
| 7,167,021 B1 | * | 1/2007 | Lewis ........................... 326/37 |
| 2006/0031659 A1 | * | 2/2006 | Chow ............................ 712/11 |

* cited by examiner

*Primary Examiner*—Don P Le
(74) *Attorney, Agent, or Firm*—Lathrop & Gage LC

(57) ABSTRACT

Provided is a digital signal processing device, specifically a modular application specific integrated circuit ("ASIC"), having a programmable crosspoint switch for facilitating data transfer and processing within the circuit. A programmable matrix element is operable to perform advanced matrix operations (arithmetic operations) according to user provided commands. The crosspoint switch interconnects the programmable matrix element with various other processing or conditioning modules (i.e. down conversion, filter, pulse processing and demodulation modules) to ensure parallel processing at System Clock rates. The ASIC, which is reconfigurable at a top-level according to user requirements, facilitates design changes and bench testing.

15 Claims, 3 Drawing Sheets

MODULAR ASIC WITH CROSSPOINT SWITCH

FIELD OF THE INVENTION

This invention relates generally to a general purpose digital signal processing device for advanced signal processing. More particularly, this invention relates to a modular, reconfigurable application specific integrated circuit.

BACKGROUND

Large-scale (multi-million gate) application specific integrated circuit ("ASIC") designs are hampered by many logistical problems. Many of these problems are related to the functional integration, timing, and testing of various submodules at the top level of the ASIC design. If sub-module design changes are required to remedy top-level timing issues, for example, costly delays and recursive design changes can result. Design changes of this nature drive up engineering, manufacturing and test costs for ASIC manufacturers.

Further, ASIC designs typically have limited reconfigurability, which is to say they may be programmable via control registers, but they use fixed architectures. These fixed architectures do not allow for functional modules to be rearranged or reconfigured by a user. ASICs such as field programmable gate arrays ("FPGAs") permit the user to reconfigure or reprogram functional modules, however, they are an extreme example which require a great deal of specialized programming and a special, fine-grained ASIC architecture to implement.

Within the current state of the art for ASIC design, manufacture, and test, there does not exist an architecture that may provide easy top-level integration of modules, routing, and timing, all within a standardized I/O scheme. Hence there is a need for an advanced ASIC architecture to address one or more of the drawbacks identified above.

SUMMARY

The application specific integrated circuit herein disclosed advances the art and overcomes problems articulated above by providing a reconfigurable, reprogrammable circuit with integrated and parallel data transfer/processing.

In particular, and by way of example only, according to an embodiment, provided is an application specific integrated circuit including: a frequency down conversion module structured and arranged to modulate a frequency of an input signal; a filter module positioned to interpolate the input signal; a demodulation module structured and arranged to detect amplitude, frequency, and phase modulation; a delay random access memory interface module operable to receive and hold at least one user supplied command; a pulse processing module structured and arranged to detect one or more pulses in, and extract data from, the input signal; at least one programmable matrix element module operable to process the input signal according to one or more user supplied commands; and a programmable circuit crosspoint switch structured and arranged to facilitate flexible reconfiguration of circuit interconnections and data transfer between the modules and the at least one programmable matrix element of the integrated circuit.

In another embodiment, provided is an application specific integrated circuit of dynamically linked modules including: a first frequency down conversion module; a second frequency down conversion module; a filter module; a demodulation module; a delay random access memory interface module; a pulse processing module; at least one programmable matrix module; and a programmable circuit crosspoint switch structured and arranged to dynamically link and transfer data between the modules of the integrated circuit.

In still another embodiment, provided is an application specific integrated circuit including: a signal conditioning means for conditioning an input signal; a programmable signal processing means, interconnected to the signal conditioning means, for processing the input signal according to user-supplied commands; and a flexible switching means operable to dynamically link the signal conditioning means and signal processing means to reconfigure interconnections and facilitate the transfer of the input signal derived data therebetween.

In yet another embodiment, provided is an improved application specific integrated circuit of the type in which an input signal is manipulated by the circuit to execute specified matrix functions, the improvement including: at least one programmable matrix element structured and arranged to manipulate the input signal and derived data according to one or more user supplied commands; and a crosspoint switch structured and arranged to facilitate flexible reconfiguration of application specific integrated circuit interconnections and data transfer within the integrated circuit.

DETAILED DESCRIPTION

Before proceeding with the detailed description, it should be noted that the present teaching is by way of example, not by limitation. The concepts herein are not limited to use or application with one specific type of an application specific integrated circuit. Thus, although the instrumentalities described herein are for the convenience of explanation, shown and described with respect to exemplary embodiments, the principles herein may be equally applied in other types of application specific integrated circuits.

Figure 1:
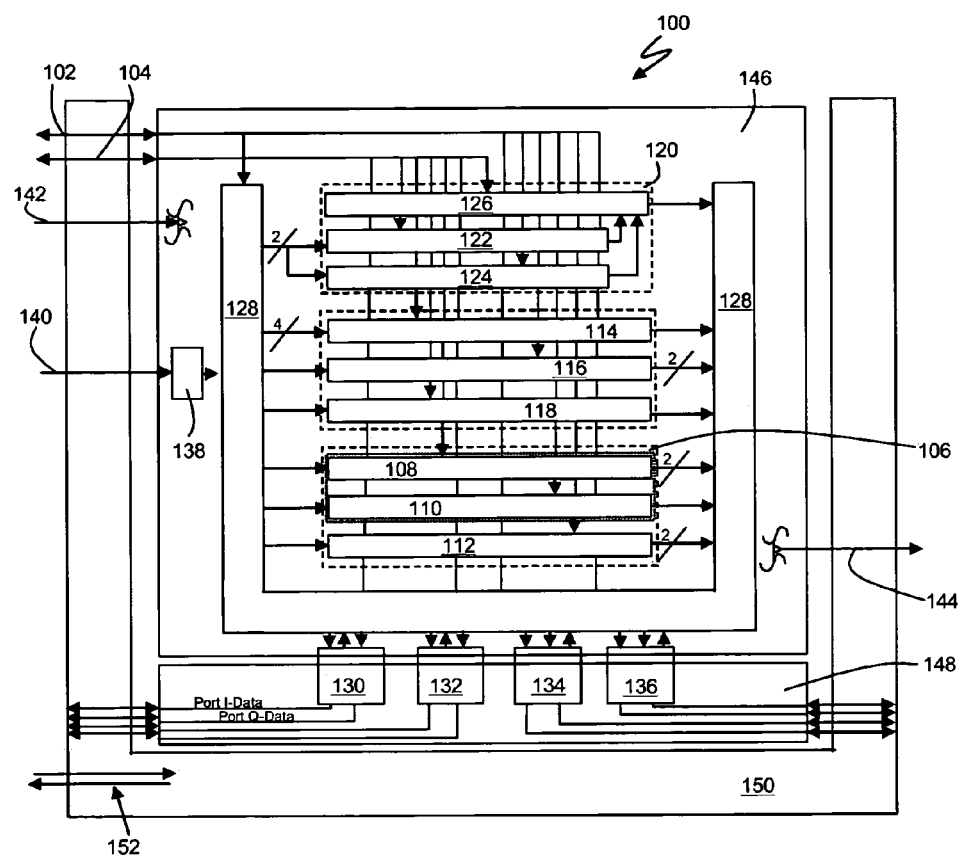
FIG. 1 is a block diagram of a application specific integrated circuit, according to an embodiment.

Referring initially to FIG. 1, a modular application specific integrated circuit ("ASIC") 100 according to an embodiment is presented. Much of the standard circuitry and interconnections of ASIC 100 have been simplified or removed for clarification and discussion. As shown, ASIC 100 is a general purpose digital signal processing device operable to support multiple, advanced signal processing applications to include, but not limited to: beamforming; FIR ("finite impulse response") filtering; demodulation; and, pulse processing. ASIC 100 may be configured to operate in a "stand alone" mode for signal processing, or alternatively, ASIC 100 may be one of multiple application specific integrated circuits operating in a "multi-circuit" mode. Control and configuration of ASIC 100 may be via a host interface, which may include the receipt of one or more host interface signals 102 and 104.

Considering ASIC 100 in greater detail, it can be seen that the integrated circuit of the present disclosure includes a plurality of processing resources or modules, interfaces, data ports, etc. for receiving, processing, controlling and transferring an input signal received by ASIC 100. At the circuit level, each module or processing resource may function at sample rates up to the System Clock rate. In at least one embodiment, the rate is 62.5 MSPS. It can be appreciated, however, that sample rates greater and/or less than 62.5 MSPS may also be used without departing from the scope of this disclosure.

A down converter or frequency down conversion module 106 is included in ASIC 100. In one embodiment, down conversion module 106 actually includes two separate yet interconnected down conversion modules or sub-modules 108 and 110 for frequency modulation and/or conversion. Down conversion modules 108, 110 may be complex frequency down conversion modules, and may include eight "on-chip" digital local oscillators (not shown).

In addition to down conversion modules 108 and 110, ASIC 100 includes a pulse processing module or "PLS" 112. PLS 112 functions to detect and characterize distinct pulses associated with the input signal. In particular, PLS 112 operates to detect, recognize and characterize a single pulse or a group of pulses, and to extract data therefrom. PLS 112 is operational with both EDB and PDW formats.

Still referring to FIG. 1, a filter module 114 for programmed interpolation of the input signal, a demodulation module 116 and a delay random access memory interface module 118 are also integrated into ASIC 100. Filter module 114 may be referred to as a "high decimation" filter module, and may include eight complex threads. Further, filter module 114 may operate essentially as a 5th order cascade integrator-comb ("CIC") filter from 16 to 1024 taps. Demodulation module 116 is able to detect and demodulate an amplitude modulated, frequency modulated, and/or phase modulated analog signal to extract desired data via a rectangular-to-polar (magnitude-phase) conversion.

Delay random access memory ("RAM") interface module 118 is external to, yet integrated with, other modules included in the structure of ASIC 100. In this manner, delay RAM interface module 118 acts to support multiple, cross-module and cross-functional operations based in part on one or more user supplied commands. In at least one embodiment, the filter module 114, demodulation module 116, delay RAM interface module 118, down conversion modules 108, 110 and PLS 112 may comprise or be referred to as a signal conditioning sub-set of ASIC 100.

Integral to ASIC 100, and interconnected to one or more signal conditioning modules, is a programmable matrix element or "PME" 120. ASIC 100 may include a plurality of PMEs, each of which may be individually addressed, programmed/reconfigured, and controlled in accordance with user supplied commands and/or matrix operation instructions. Stated differently, PME 120 may implement any of a number of signal processing functions based on user-supplied microcodes or instructions. Each PME, e.g. PME 120, may include "on-chip" beam forming, to include: high-speed matrix arithmetic; covariance, correlation and complex limits functions; matrix decomposition; back substitution; and/or a liner combiner with multiple weight sets. Matrix, or complex matrix, arithmetic or other functions performed by PME 120 may include interpolation, addition, subtraction, multiplication, division, accumulation, storage and scaling of both complex and real numbers.

The input and output protocol for each PME 120 is a standard input/output ("I/O") format for digital signal processing. In at least one embodiment, PME operations may include 16 independent functions. Further, each PME, e.g. PME 120, may include high-performance digital filtering, as well as real or complex number FIR ("finite impulse response") filtering using 1, 2, 4, 8 or 16 filters. In one embodiment, each PME 120 includes a programmable number of taps up to 1024. In particular, PME 120 may include 8 filters with 512 taps @ 244 CKSPS, 8 filters with 128 taps @ 975 CKSPS; 4 filters with 256 taps @ 975 CKSPS, 4 filters with 64 taps @3.9 CMSPS; 1 filter with 64 taps @12.8 CMSPS, 1 filter with 32 taps @25.6 CMSPS.

PME 120 is reconfigurable, which is to say it may be programmed or reprogrammed to perform one or more processing functions related to matrix operations. Each PME 120 within ASIC 100 may be programmed to function independently or in conjunction with other PMEs. Also, functions within PME 120 may be performed in parallel, without many of the limitations of serial data processing. In particular, serial processing or functioning may be used exclusively to monitor and control processes, as opposed to impacting data transfer and flow.

Each PME, e.g. PME 120, may include eight multi-stage (which may be two-stage) processing modules or PME dual-stage subchips ("PMEDs"). In FIG. 1, four each PMED modules are represented by module sets 122 and 124 respectively. Each stage of the first 122 and the second 124 sets of multi-stage data processing modules may include: at least one data manipulation module (not shown) operable to execute complex functions for manipulating input signal and/or derived data; a module crosspoint switch (not shown) for facilitating parallel distribution and manipulation of data within each stage; and a control module (not shown) operable to control manipulation functions, store data, and route one or more manipulated input signals within the stage. Also, at least one data manipulation module operates on a data set of real and complex numbers, and is selected from a group consisting of: addition, subtraction, multiplication, accumulation, storage and scaling modules. The specifics of stage functionality and structure are contained in U.S. Patent Application No. TBD, entitled "CPU Datapipe Architecture with Crosspoint Switch", assigned to the same assignee as the present disclosure and incorporated by reference herein.

Further, PME 120 includes a multiplicity of bundled functions, or circuit operation functions, to include Reset/Enable, Host, Output Formatter, and SP0/SP1 multiplexing functions housed within a single programmable matrix element support module, which may be designated "PME Other" or the PME Other support module 126. Together, the PME 120 and PME Other module 126 may be considered a signal processing sub-set of ASIC 100.

Still referring to FIG. 1, ASIC 100 also includes a programmable or flexible crosspoint switch module or "CPS" 128. The specific structure and operation of CPS 128 are discussed below, with reference to FIGS. 2-4. In general, however, CPS 128 uses standardized interfaces to dynamically link the various modules of ASIC 100. In particular, CPS 128 is programmable to allow for flexible reconfiguration of circuit interconnections and data transfers between internal processing resources or modules, e.g. PME 120, demodulation module 116, etc. CPS 128 provides complex data connections per channel between the various modules. The ability to configure "per channel" allows for signals from various multiplexed outputs to be used by one or more modules if so desired. In at least one embodiment, CPS 128 supports connections based upon data streams with 32 channels, or time divisions. Each channel may contain standard bus format data, or one complex data word (18 bits, 18 bits), a 1-bit data valid, and a 1-bit matrix sync. Each channel may be numbered sequentially in increasing order as a function of time, starting with "0", and each channel occupies exactly one system clock.

A plurality of high-speed, parallel data ports, of which data ports 130, 132, 134 and 136 are exemplary, are interconnected to CPS 128 for the transfer of one or more input signals into, and the transfer of one or more output signals (generated in at least one embodiment by PME 120) out of, ASIC 100. Each port 130-136 may accommodate asynchronous and dual real inputs, and may have up to 32 signal streams multiplexed into the port. As shown in FIG. 1, both "I" and "Q" numeric data derived from input signals may be transferred via the data ports 130-136.

ASIC 100 may also include a Reset/Sync interface 138 for receiving a reset or sync signal 140 from a host system or subsystem (not shown). Further, a system clock input 142 and a system clock output 144 are integral to ASIC 100. Of note, in one embodiment of the present disclosure, ASIC 100 may be sub-divided into three clock domains. As represented in FIG. 1. ASIC 100 may include a "system clock domain" 146, an "input clock" domain 148, and a JTAG or "Joint Test Action Group clock domain" 150. ASIC 100 may also include a JTAG interface 152 for facilitating testing of the integrated circuit.

Figure 2:
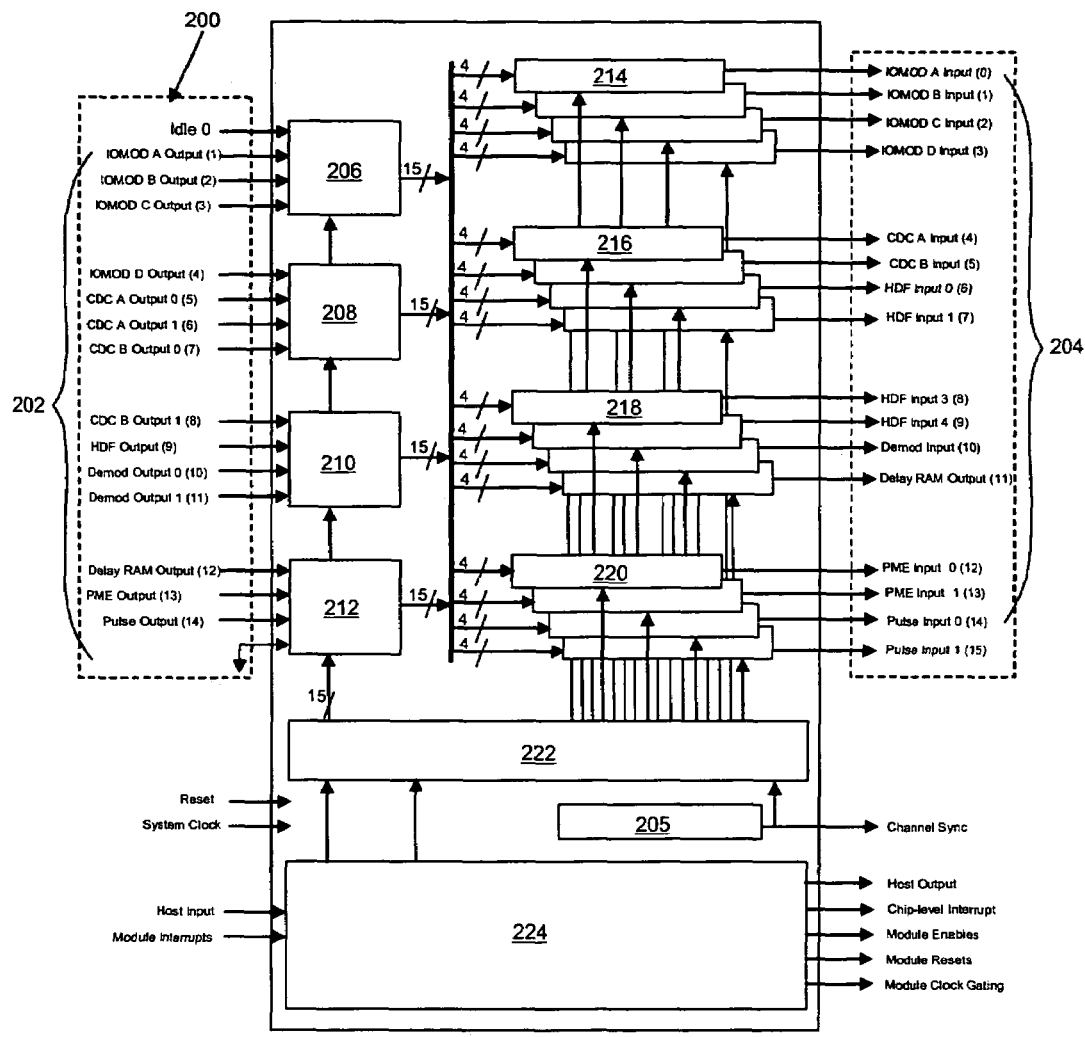
FIG. 2 is block diagram of a crosspoint switch, according to an embodiment.

Referring now to FIG. 2, a detailed block diagram of CPS 128 is presented. As shown, CPS 128 includes a plurality of standard inputs 200. More specifically, in at least one embodiment, CPS 128 accepts fourteen (14) standard inputs 202 from a variety of locations, to include ASIC 100 internal modules, e.g. the delay RAM interface module 118. Data strobe rates up to the System Clock rate may be accepted, and non-uniform strobe intervals may be allowed so long as the interval is an integer multiple of the System Clock. Similarly, CPS 128 may include a plurality of standard outputs 204 which may derive or flow from various modules to include PME 120, pulse processor module 112, etc.

Additional CPS 128 inputs/outputs may include: clocking (system clock used to clock internal CPS 128 circuitry); reset (an active low reset input can be accepted to reset all registers (not shown) within CPS 128); module interrupts (CPS 128 may accept nineteen module interrupts, which may be used, in part, to determine the ASIC 100 interrupt); channel sync generated by CPS 128 (via the channel sync element 205); twelve module resets which may be used to return modules to their initial state without altering the state of the overall programmable configuration; module clock gating controls (nineteen total in one embodiment) to enable/disable the System Clock to one or more modules; and module enables (twelve total in one embodiment) for holding a given module in the initial state so that configuration/reconfiguration programming may occur.

Integral to CPS 128 are a series of both first and second level "Mux" or multiplexing modules. In one embodiment, first level Mux modules labeled "0" through "3" (206, 208, 210 and 212 respectively) are capable of receiving and multiplexing input signals at a ratio of 4:1 (input to output signals). Similarly, a grouping of second level Mux modules, 214, 216, 218 and 220 respectively, also operate and multiplex at a 4:1 ratio of input to output signals. As shown in FIG. 2, sixteen (16) "shadow Mux control" modules, represented by block 222, may be interconnected to both the first 206-212 and second 214-220 Mux modules. Shadow Mux modules 222 receive input/control signals from a CPS Host or Host Interface Configuration module 224.

CPS Host module 224 may contain a standard host interface that includes: programming registers for module reset/enable functions; channel connections; a channel connections shadow update, clock gating, and "chip-level" interrupt functions. CPS Host module 224 may receive input signals from the host (system, subsystem, etc.) and likewise output manipulated signals to the host.

Figure 3:
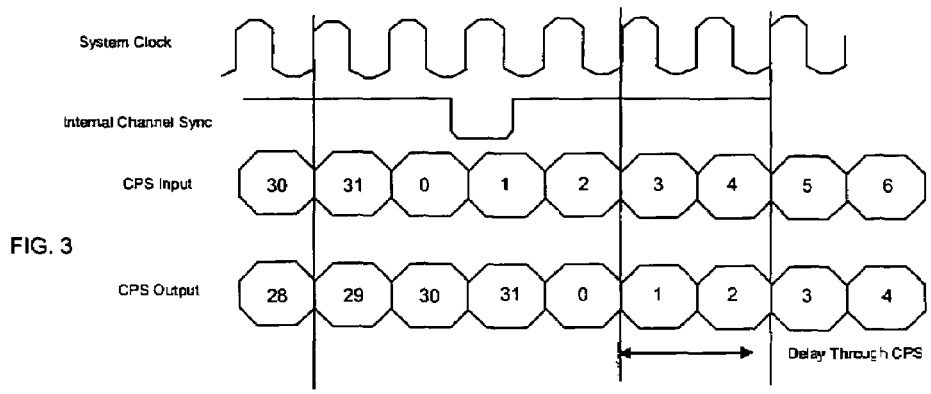
FIG. 3 is a schematic of an input to output relationship for an ASIC having a crosspoint switch, according to an embodiment.
Figure 4:
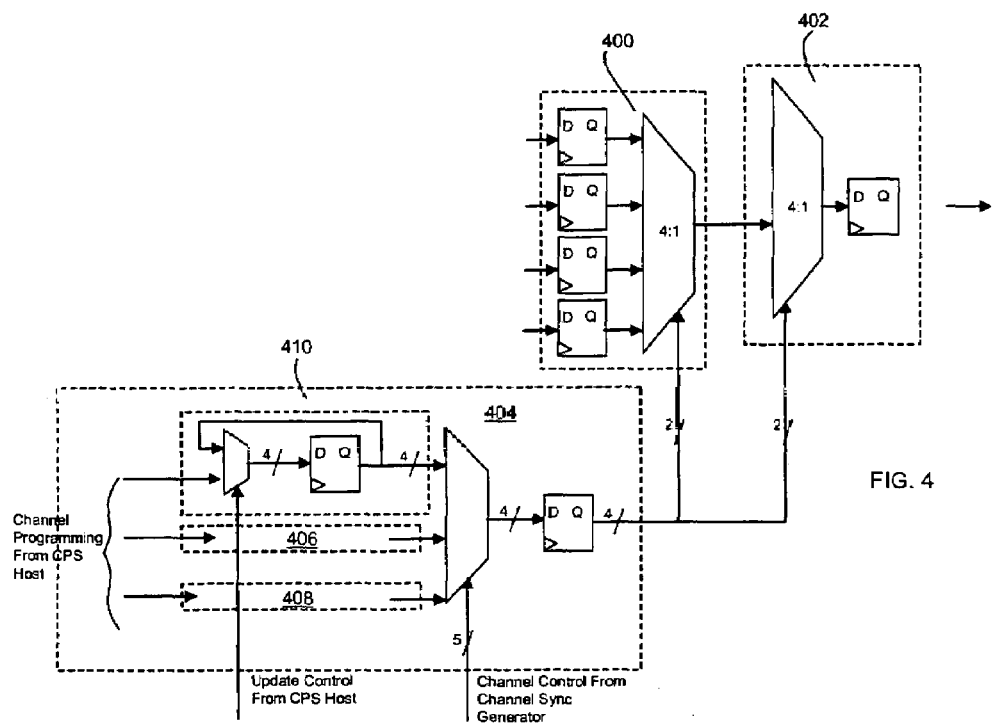
FIG. 4 is a crosspoint switch functional diagram, according to an embodiment.

Referring now to FIGS. 3 and 4, CPS 128 data interconnection may be more clearly understood with reference to these figures. As discussed above, ASIC 100, and more particularly CPS 128, permits flexible interconnection of the internal processing resources such as PME 120. Connections based upon data streams with 32 channels may be supported, and each channel typically occupies exactly one system clock.

Channel multiplexing is accomplished by a unified integration of the processing resource, e.g. PME 120, and CPS 128. For example, most processing resources are intended to accept data that is based upon an internal channel sync. The internal channel sync, generated by the channel sync element 205 of CPS 128, determines the channel number of an input signal or data presented to a processing resource or module, e.g. PME 120. Most processing resources require an input signal-to-channel assignment register programming to map the signal (or data) from CPS 128 into a processing module. Of note, the processing resource can have any amount of latency during processing. Once processing is complete, most processing resources within ASIC 100 use an output signal-to-channel assignment register programming to map the internal results of the processing back to a given channel number. The processing resource, e.g. PME 120, then passes the mapped results to CPS 128 based upon the internal channel sync and the CPS 128 "connection latency delay."

Typically, as shown in FIG. 3, the connection latency delay is two clocks. CPS 128 connection latency delay is a fixed, derived parameter. In at least one embodiment of the present disclosure, most processing resources or modules automatically compensate for one of the two clocks. These same modules then use their output signal-to-channel assignment register programming to compensate for the second clock of latency.

In one embodiment of the present disclosure, certain modules within ASIC 100 may not have output signal-to-channel assignment register programming, and therefore do not correctly compensate for the latency of CPS 128. For example, data from data ports, e.g. port 130, or from the delay RAM interface module 118, will slide data one channel. Similarly, data from one or more down conversion modules (108,110) is processed and output without regard or consideration for channel.

CPS module 128 implements the source-to-destination channel mapping function required to implement channel multiplexing as described above. Typically there are 16 module inputs. Also, there are 32 4-bit programming registers per module input, each representing a specific channel number. Each 4-bit register can be programmed with a module output code representative of one of the many ASIC 100 modules disclosed. As can be appreciated by referring to FIG. 4, the programming or channel-programming registers and shadow Mux registers of the "shadow Mux" modules 222 work in conjunction to allow ASIC operation (signal manipulation) while programming occurs. In FIG. 4, a first level Mux 400 simplified to a single bit, and a second level Mux 402, also simplified to a single bit, are shown. Each is interconnected to shadow Mux control 404. For the purposes of explanation only a single standard data bus is shown. A new channel value from the host interface updates the channel-programming registers 406, 408. The shadow Mux registers, e.g. register 410, however, may not update until an update connection command is received. Channel selections within the channel-programming registers 406, 408 may be readable via the host interface. By contrast, the shadow Mux registers 410 may not be directly readable. The channel-programming registers 406, 408 and shadow Mux register 410 maintain the same values until a new channel value is written via the host interface, or a new "chip-level" reset is received. In this manner, source-to-destination channel mapping may occur within CPS 128 to facilitate ASIC 100 functions and operations.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. An application specific integrated circuit comprising:
   a frequency down conversion module structured and arranged to modulate a frequency of an input signal;
   a filter module positioned to interpolate the input signal;
   a demodulation module structured and arranged to detect amplitude, frequency, and phase modulation;
   a delay random access memory interface module operable to receive and hold at least one user supplied command;
   a pulse processing module structured and arranged to detect one or more pulses in, and extract data from, the input signal;
   at least one programmable matrix element module operable to process the input signal according to one or more user supplied commands; and
   a programmable circuit crosspoint switch structured and arranged to facilitate flexible reconfiguration of circuit interconnections and data transfer between the modules and the at least one programmable matrix element of the integrated circuit.

2. The integrated circuit of claim 1, further comprising a plurality of high-speed, parallel data ports positioned to transfer the input signal into the integrated circuit, and to transfer one or more output signals, generated by the at least one programmable matrix element, out of the integrated circuit.

3. The integrated circuit of claim 1, wherein the at least one programmable matrix element comprises:
   a first set of multi-stage data processing modules; and
   a second set of multi-stage data processing modules.

4. The integrated circuit of claim 3, wherein each of the first and the second sets of multi-stage data processing modules includes four multi-stage data processing modules.

5. The integrated circuit of claim 3, wherein the first and the second sets of multi-stage data processing modules are each two-stage data processing modules.

6. The integrated circuit of claim 3, wherein each stage of the first and the second sets of multi-stage data processing modules comprises:
   at least one data manipulation module operable to execute complex functions for manipulating data;
   a module crosspoint switch positioned to facilitate parallel distribution and manipulation of data within the stage; and
   a control module operable to control manipulation functions, store data, and route one or more manipulated input signals within the stage.

7. The at least one programmable matrix element of claim 6, wherein the at least one data manipulation module operates on a data set of real and complex numbers, and is selected from a group consisting of: addition, subtraction, multiplication, accumulation, storage and scaling modules.

8. The integrated circuit of claim 1, further comprising a PME Other module containing one or more circuit operation or support functions.

9. An application specific integrated circuit of dynamically linked modules comprising:
   a first frequency down conversion module;
   a second frequency down conversion module;
   a filter module;
   a demodulation module;
   a delay random access memory interface module;
   a pulse processing module;
   at least one programmable matrix module; and
   a programmable circuit crosspoint switch structured and arranged to dynamically link and transfer data between the modules of the integrated circuit.

10. An application specific integrated circuit comprising:
    a signal conditioning means for conditioning an input signal;
    a programmable signal processing means interconnected to the signal conditioning means for processing the input signal according to user-supplied commands; and
    a flexible switching means operable to dynamically link the signal conditioning means and signal processing means to reconfigure interconnections and facilitate the transfer of the input signal derived data therebetween wherein the signal conditioning means comprises:
    a frequency down conversion module structured and arranged to modulate a frequency of the input signal;
    a filter module operable to interpolate the input signal;
    a demodulation module structured and arranged to detect amplitude, frequency, and phase modulation;
    a delay random access memory interface module operable to receive and hold at least one user supplied command; and
    a pulse processing module structured and arranged to detect one or more pulses in, and extract data from, the input signal.

11. The application specific integrated circuit of claim 10, wherein the frequency down conversion module comprises:
    a first down converter; and
    a second down converter.

12. An application specific integrated circuit comprising:
    a signal conditioning means for conditioning an input signal;
    a programmable signal processing means, interconnected to the signal conditioning means, for processing the input signal according to user-supplied commands; and
    a flexible switching means operable to dynamically link the signal conditioning means and signal processing means to reconfigure interconnections and facilitate the transfer of the input signal derived data therebetween wherein the a programmable signal processing means comprises:
    at least one programmable matrix element; and
    a programmable matrix element support module, wherein the support module contains multiple data processing support functions;
    wherein the at least one programmable matrix element further comprises
    a first set of multi-stage data processing modules and a second set of multi-stage data processing modules; and
    wherein each stage of the first and the second sets of multi-stage data processing modules includes at least one data manipulation module operable to execute complex functions for manipulating data; a programmable module crosspoint switch positioned to facilitate parallel distribution and manipulation of data within the stage; and a control module operable to control manipulation functions, store data, and route one or more manipulated input signals within the stage.

13. An improved application specific integrated circuit of the type in which an input signal is manipulated by the circuit to execute specified matrix functions, the improvement comprising:

at least one programmable matrix element structured and arranged to manipulate the input signal and derived data according to one or more user supplied commands wherein the at least one programmable matrix element comprises a first set of multi-stage data processing modules, a second set of multi-stage data processing modules and a programmable matrix element support module interconnected to the first and second sets of multi-stage processing modules, wherein the support module contains multiple data processing support functions; and a crosspoint switch structured and arranged to facilitate flexible reconfiguration of application specific integrated circuit interconnections and data transfer within the integrated circuit.

14. The improved application specific integrated circuit of claim 13, wherein each stage of the first set and the second set of multi-stage data processing modules comprises:

at least one data manipulation module operable to execute complex functions for manipulating data;

a module crosspoint switch positioned to facilitate parallel distribution and manipulation of the data within the stage; and a control module operable to control manipulation functions, store data, and route one or more manipulated input signals within the stage.

15. The improved application specific integrated circuit of claim 13, wherein each of the first and the second sets of multi-stage data processing modules includes four multi-stage data processing modules.

* * * * *